(12) United States Patent
Weber et al.

(10) Patent No.: US 6,409,816 B1
(45) Date of Patent: *Jun. 25, 2002

(54) PIGMENT PREPARATIONS BASED ON DIKETOPYRROLOPYRROLE PIGMENTS WITH BASIC PERYLENE DISPERSANTS

(75) Inventors: Joachim Weber, Frankfurt; Erwin Dietz, Koenigstein, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/505,364

(22) Filed: Feb. 16, 2000

(30) Foreign Application Priority Data

Feb. 17, 1999 (DE) .......................................... 199 06 494

(51) Int. Cl.⁷ .......................... C09B 5/62; C09B 57/00; C09B 67/20; C09D 11/02; B01F 17/32
(52) U.S. Cl. ........................ 106/494; 106/493; 106/495; 106/496; 106/497; 106/498; 106/499
(58) Field of Search ................................. 106/493, 494, 106/495, 496, 497, 498, 499; 546/37

(56) References Cited

U.S. PATENT DOCUMENTS

| 4,310,359 A |   | 1/1982  | Ehashi et al.      | 106/288 Q |
|-------------|---|---------|--------------------|-----------|
| 4,599,408 A |   | 7/1986  | Spietschka et al.  | 544/125   |
| 4,762,569 A |   | 8/1988  | Mild et al.        | 106/476   |
| 4,986,852 A |   | 1/1991  | Dietz et al.       | 106/498   |
| 5,248,774 A | * | 9/1993  | Dietz et al.       | 544/125   |
| 5,264,032 A | * | 11/1993 | Dietz et al.       | 106/411   |
| 5,264,034 A |   | 11/1993 | Dietz et al.       | 106/493   |
| 5,466,807 A |   | 11/1995 | Dietz et al.       | 546/6     |
| 5,472,494 A | * | 12/1995 | Hetzenegger et al. | 106/493   |
| 5,958,129 A |   | 9/1999  | Urban et al.       | 106/498   |
| 6,036,766 A | * | 3/2000  | Hendi et al.       | 106/494   |
| 6,066,202 A | * | 5/2000  | Wallquist et al.   | 106/494   |

FOREIGN PATENT DOCUMENTS

| DE | 197 09 798  |   | 9/1998 |
| EP | 0 864 613 A2 |   | 9/1998 |
| EP | 937724      | * | 8/1999 |
| JP | 3-26767     |   | 2/1991 |

OTHER PUBLICATIONS

ESP@cenet patent abstract for EP0486531 (Feb. 1991).
English Translation for Japan Patent No. 3–26767 (Feb. 1991).
Translator's Report/Comments (no date).

* cited by examiner

*Primary Examiner*—Anthony Green
(74) *Attorney, Agent, or Firm*—Susan S. Jackson; Scott E. Hanf

(57) ABSTRACT

Pigment preparations comprise
 a) at least one diketopyrrolopyrrole pigment, and
 b) at least one perylene pigment dispersant of the formula (I)

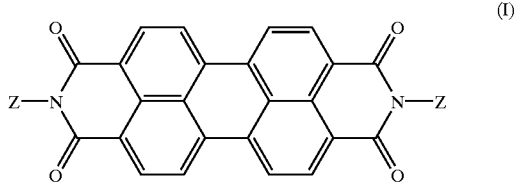

and have advantageous rheological and coloristic properties.

16 Claims, No Drawings

PIGMENT PREPARATIONS BASED ON DIKETOPYRROLOPYRROLE PIGMENTS WITH BASIC PERYLENE DISPERSANTS

BACKGROUND OF THE INVENTION

1. Field of the Invention

The present invention relates to novel pigment preparations based on diketopyrrolopyrrole pigments and basic perylene dispersants, having improved coloristic and rheological properties, and to their preparation and use for pigmenting high molecular mass materials.

2. Description of the Related Art

Pigment preparations are combinations of pigments and pigment dispersants that are structurally analogous to pigments and are substituted by groups having a specific effect. The dispersants are added to the pigments in order to facilitate their dispersion in the application media, especially in varnishes, and in order to improve the rheological and coloristic properties of the pigments. The viscosity of the highly pigmented paint concentrates (millbase) is lowered and the flocculation of the pigment particles reduced. This makes it possible, for example, to enhance the transparency and gloss. Such enhancement is particularly desirable in the case of metallic pigments.

JP-A-03-026 767 discloses basic sulfonamides of diketopyrrolopyrroles and their use as dispersants with various pigments.

DE-A-197 09 798 discloses pigment preparations comprising asymmetric, and U.S. Pat. No. 4,762,569 the production of pigment preparations comprising symmetric, perylene-3,4,9,10-tetracarboxylic diimides. The use of these perylene dispersants with diketopyrrolopyrrole pigments, however, has not been described.

In the case of diketopyrrolopyrrole pigments there was a need for improvement and thus the object was to provide diketopyrrolopyrrole pigment preparations which satisfy the present-day requirements of the state of the art in terms of coloristics, rheology and universal applicability.

SUMMARY OF THE INVENTION

It has been found that this object is surprisingly achieved by means of pigment preparations which in addition to the diketopyrrolopyrrole pigment comprise certain symmetric or asymmetric perylene-3,4,9,10-tetracarboxylic diimides. It was unforeseeable that a combination of a diketopyrrolopyrrole pigment with a pigment dispersant that was not a structural derivative of a diketopyrrolopyrrole would exhibit advantages over the diketopyrrolopyrrole pigment alone.

DESCRIPTION OF THE PREFERRED EMBODIMENTS

The invention provides pigment preparations comprising
a) at least one diketopyrrolopyrrole pigment or a mixed crystal containing a diketopyrrolopyrrole pigment, and
b) at least one pigment dispersant of the formula (I),

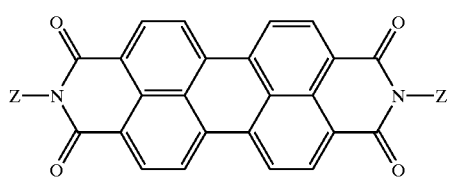

in which the two radicals Z are identical or different and have the definition $Z^3$ or $Z^4$ with the proviso that both radicals Z are not simultaneously $Z^4$, and in which $Z^3$ is a radical of the formula (Ic),

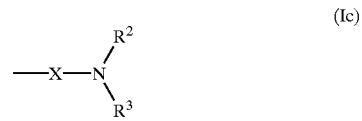

in which
$R^2$ and $R^3$ are identical or different and are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, possible substituents being hydroxyl, phenyl, cyano, chloro, bromo, $C_2$–$C_4$-acyl and $C_1$–$C_4$-alkoxy and preferably being 1 to 4 in number, or
$R^2$ and $R^3$ together with the nitrogen atom form a saturated, unsaturated or aromatic heterocyclic ring with or without a further nitrogen, oxygen or sulfur atom in the ring; and
X is a branched or unbranched $C_2$–$C_6$-alkylene radical or a $C_5$–$C_7$-cycloalkylene radical which can be substituted by from 1 to 4 $C_1$–$C_4$-alkyl radicals, hydroxyl radicals, hydroxyalkyl radicals having 1 to 4 carbon atoms and/or by 1 or 2 further $C_5$–$C_7$-cycloalkyl radicals;
$Z^4$ is hydrogen, hydroxyl, amino, phenyl, ($C_1$–$C_4$-alkyl)phenyl or $C_1$–$C_{20}$-alkyl, it being possible for the phenyl ring and the alkyl group to be substituted by one or more—e.g., 1, 2, 3 or 4—substituents from the group consisting of Cl, Br, CN, OH, $C_6H_5$, carbamoyl, $C_2$–$C_4$-acyl and $C_1$–$C_4$-alkoxy—e.g., methoxy or ethoxy—and for the phenyl ring to be substituted by $NR^2R^3$, $R^2$ and $R^3$ being as defined above, or for the alkyl group to be perfluorinated or partly fluorinated.

Depending on the radicals Z selected, symmetric or asymmetric pigment dispersants of the formula (I) are obtained, asymmetric pigment dispersants of the formula (I) including those having different radicals $Z^3$.

Advantageous pigment dispersants, for example, are those of the formula (I) in which X is a $C_2$–$C_4$-alkylene radical or cyclohexylene.

Advantageous pigment dispersants, for example, are those of the formula (I) in which
$R^2$ and $R^3$ independently of one another are a hydrogen atom, a $C_1$–$C_6$-alkyl group, or a $C_1$–$C_6$-alkyl group substituted by 1 or 2 substituents from the group consisting of hydroxyl, acetyl, methoxy, ethoxy, chloro and bromo, or $R^2$ and $R^3$ together with the adjacent nitrogen atom form an imidazolyl, piperidyl, morpholinyl, pipecolinyl, pyrrolyl, pyrrolidinyl, pyrazolyl or piperazinyl ring.

Particularly advantageous pigment dispersants are, for example, those of the formula (I) in which $Z^3$ has one of the definitions —$(CH_2)_2$—$NH_2$, —$(CH_2)_3$—$NH_2$,

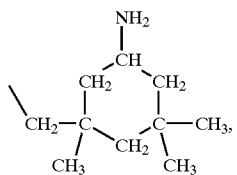

—CH$_2$—CH(CH$_3$)—NH$_2$, —CH$_2$—C(CH$_3$)$_2$—CH$_2$—NH$_2$,

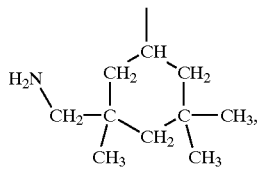

—(CH$_2$)$_2$—NH—CH$_3$, —(CH$_2$)$_2$—N(CH$_3$)$_2$, —(CH$_2$)$_2$—NH—CH$_2$—CH$_3$, —(CH$_2$)$_2$—N(CH$_2$—CH$_3$)$_2$, —(CH$_2$)$_3$—NH—CH$_3$, —(CH$_2$)$_3$—N(CH$_3$)$_2$, —(CH$_2$)$_3$—NH—CH$_2$—CH$_3$ and —(CH$_2$)$_3$—N(CH$_2$—CH$_3$)$_2$.

Advantageous pigment dispersants are, for example, those of the formula (I) in which $Z^4$ is hydrogen, amino, phenyl, benzyl, NR$^2$R$^3$-substituted phenyl or benzyl, C$_1$–C$_6$-alkyl or a C$_2$–C$_6$-alkyl substituted by 1 or 2 substituents from the group consisting of hydroxyl, acetyl, methoxy and ethoxy, and with particular preference hydrogen,

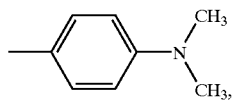 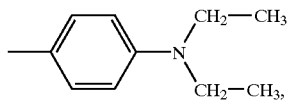

methyl, ethyl, propyl, butyl, benzyl, hydroxyethyl, hydroxypropyl or methoxypropyl.

The perylene compounds of the formula (I) that are used in accordance with the invention as pigment dispersants as per b) can be prepared, for example, in accordance with DE-A-197 09 798 or in accordance with U.S. Pat. No. 4,762,569.

Component a) comprises diketopyrrolopyrrole pigments, mixtures of at least 2—e.g., 2 or 3—such pigments, or mixtures comprising at least 1—e.g., 1, 2 or 3—diketopyrrolopyrrole pigments, and also mixed crystals containing diketopyrrolopyrrole pigments, which may also be present in the form of conventional pigment preparations.

For the purposes of the present invention, suitable diketopyrrolopyrroles include or are, for example, C.I. Pigment Red 254 (C.I. No. 56 110), C.I. Pigment Red 255 (C.I. No. 56 1050), C.I. Pigment Red 264 (C.I. No. 561 300), C.I. Pigment Red 270, C.I. Pigment Red 272 (C.I. No. 56 1150), C.I. Pigment Orange 71 (C.I. No. 561 200), C.I. Pigment Orange 73 (C.I. No. 561 170). Component a) can also, for example, be a mixture of a diketopyrrolopyrrole and a quinacridone pigment.

The amount of the pigment dispersants of b) of the formula (I) in the pigment preparations of the invention can vary within wide limits provided it does not adversely affect the target pigment quality; in general, however, the amount is from 1 to 40% by weight, preferably from 2 to 30% by weight, based on the overall weight of the pigment preparation.

The pigment preparations of the invention may further include surface-active agents and other conventional additives, such as, for example, fillers, standardizers, resins, defoamers, antidust agents, extenders, shading colorants, preservatives and drying retarders.

Preferred pigment preparations for the purposes of the present invention consist essentially of
  i) from 40 to 99% by weight, preferably from 70 to 98% by weight, of component a);
  ii) from 1 to 40% by weight, preferably from 2 to 30% by weight, of at least one, preferably 1, 2 or 3, pigment dispersants as per b) of the formula (I);
  iii) from 0 to 20% by weight, preferably from 0.1 to 15% by weight, of surface-active agents; and
  iv) from 0 to 20% by weight, preferably from 0.1 to 10% by weight, of other, conventional additives,
the fractions of the respective components being based on the overall weight of the preparation (100% by weight).

Suitable surface-active agents include conventional anionic, cationic or nonionic surfactants or mixtures thereof, examples of anionic substances being fatty acid taurides, fatty acid N-methyl taurides, fatty acid isethionates, alkylbenzenesulfonates, alkylnaphthalenesulfonates, alkylphenol polyglycol ether sulfates and fatty alcohol polyglycol ether sulfates; fatty acids, e.g., palmitic, stearic and oleic acids; soaps, e.g., alkali metal salts of fatty acids, naphthenic acids and resin acids, such as abietic acid, alkali-soluble resins, such as rosin-modified maleate resins and condensation products based on cyanuric chloride, taurine, N,N-dialkylaminoalkylamine, such as N,N-diethylaminopropylamine, and p-phenylenediamine; preference is given to resin soaps, i.e., alkali metal salts of resin acids. Examples of suitable cationic substances are quaternary ammonium salts, fatty amine ethoxylates, fatty amine polyglycol ethers, and fatty amines. Examples of suitable nonionic substances are amine oxides, fatty alcohol polyglycol ethers, fatty acid polyglycol esters, and alkylphenol polyglycol ethers.

The pigment preparations of the invention are generally solid systems of free-flowing pulverulent consistency, or granules.

The dispersing effect which can be achieved in accordance with the invention is assumed to derive from a modification of the surface structure of the base pigments by the pigment dispersants of b). Thus in a range of cases the efficacy of the pigment dispersants of b) and the quality of the pigment preparations produced therewith are dependent on the point in time at which the pigment dispersants of b) are added in the production process of the pigment of a). The pigment dispersants of b) can be added simultaneously or at different points in time or can be mixed prior to their addition.

The efficacy of the pigment dispersants of b) may also depend on their particle size and particle morphology and on the extent of the available pigment surface. It may be advantageous to add the pigment dispersants of b) to the pigment of a) only in the prospective application medium. The optimum concentration of the pigment dispersants of b) in each case must be determined by means of preliminary guideline experiments, since the enhancement of the properties of the pigments of a) is not always in linear proportion to the amount of pigment dispersant. The pigment preparations of the invention can be mixtures of one or more, preferably 1 or 2, pigments of a) with one or more, preferably 1 or 2, of the pigment dispersants of b).

The invention also provides a process for producing a pigment preparation of the invention, which comprises mixing the pigment dispersant(s) of b) and the pigment(s) of a) with one another or allowing them to act on one another at any desired point in time during their production process.

The production process of an organic pigment embraces its synthesis, possible fine division, by grinding or reprecipitation, for example, possibly a finish, and its isolation as a presscake or in the form of dry granules or powder. For example, the pigment dispersants of b) can be added prior to or during the pigment synthesis, immediately prior to or during a fine division process or a subsequent finish. The temperatures prevailing in the course of these processes can be, for example, from 0 to 200° C. The pigment dispersants of b) can of course also be added in portions at different times.

The addition of the pigment dispersants of b) as part of a fine division process takes place, for example, prior to or during the dry grinding of a crude pigment with or without additional milling auxiliaries on a rollmill or vibratory mill, or prior to or during the wet grinding of a crude pigment in an aqueous, aqueous-organic or organic grinding medium on, for example, a bead mill.

It has also proven suitable to add the pigment dispersants of b) before or after finishing the pigment of a) in an aqueous, aqueous-alkaline, aqueous-organic or organic medium. The pigment dispersants of b) can also be added and incorporated to the water-moist pigment presscake before drying, in which case the pigment dispersants of b) may themselves likewise be present as presscakes. A further possibility is to make dry mixes of powders or granules of the pigment dispersants of b) with the powder or granules of one or more pigments of a).

The pigment preparations obtainable in accordance with the present invention are notable for their outstanding coloristic and Theological properties, especially for outstanding rheology, high flocculation stability, high transparency, ready dispersibility, excellent gloss behavior, high color strength, excellent fastness to overcoating and to solvents, and very good wetfastness, for example. They are suitable for use in both solventborne and aqueous systems.

The pigment preparations produced in accordance with the invention can be used to pigment high molecular mass organic materials of natural or synthetic origin, examples being plastics, resins, varnishes, paints, electrophotographic toners and developers, and writing, drawing and printing inks.

Examples of high molecular mass organic materials which can be pigmented with the pigment preparations are cellulose ethers and cellulose esters, such as ethylcellulose, nitrocellulose, cellulose acetate or cellulose butyrate, natural resins or synthetic resins, such as addition-polymerization resins or condensation resins, e.g., amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone, and silicone resins, individually or in mixtures.

It is unimportant whether the abovementioned high molecular mass organic compounds are present in the form of plastic masses, melts, spinning solutions, varnishes, paints or printing inks. Depending on the intended use it is found advantageous to utilize the pigment preparations of the invention as a blend or in the form of prepared formulations or dispersions. Based on the high molecular mass organic material to be pigmented, the pigment preparations of the invention are used in an amount of preferably from 0.05 to 30% by weight, more preferably from 0.1 to 10% by weight.

The pigment preparations of the invention are also suitable as colorants in electrophotographic toners and developers, such as one- or two-component powder toners (also called one- or two-component developers), magnetic toners, liquid toners, polymerization toners, and specialty toners, for example (L. B. Schein, "Electrophotography and Development Physics"; Springer Series in Electrophysics 14, Springer Verlag, 2nd edition, 1992).

Typical toner binders are addition polymerization, polyaddition and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may include further constituents, such as charge control agents, waxes or flow assistants, or may be modified subsequently with these additives.

Furthermore, the pigment preparations of the invention are suitable as colorants in powders and powder coating materials, especially in triboelectrically or electrokinetically sprayable powder coating materials, which are used to coat the surfaces of articles made, for example, of metal, wood, plastic, glass, ceramic, concrete, textile material, paper or rubber (J. F. Hughes, "Electrostatics Powder Coating" Research Studies, John Wiley & Sons, 1984).

Typical powder coating resins employed are epoxy resins, carboxyl- and hydroxyl-containing polyester resins, polyurethane resins and acrylic resins, together with customary hardeners. Resin combinations are also used. For example, epoxy resins are frequently used in combination with carboxyl- and hydroxyl-containing polyester resins. Typical hardener components (depending on the resin system) are, for example, acid anhydrides, imidazoles and also dicyanodiamide and derivatives thereof, blocked isocyanates, bisacylurethanes, phenolic resins and melamine resins, triglycidyl isocyanurates, oxazolines, and dicarboxylic acids.

In addition, the pigment preparations of the invention are suitable for use as colorants in inkjet inks on either an aqueous or nonaqueous basis and in those inks which operate in accordance with the hot-melt technique.

The pigment preparations of the invention are also suitable, however, as colorants for color filters and for both additive and subtractive color generation.

It is also possible for the pigment dispersants of b) to be added to the pigment dispersant of a), or vice versa, only in the application medium. The invention therefore also provides a prepared pigment formulation consisting essentially of said pigment of a), of said pigment dispersants of b), of said high molecular mass organic material, especially varnish, and, if desired, surface-active agents and/or other customary additives. The overall amount of pigment of a) plus pigment dispersants of b) is judiciously from 0.05 to 30% by weight, preferably from 0.1 to 10% by weight, based on the overall weight of the prepared pigment formulation.

In order to evaluate the properties in the coatings sector of the pigment preparations produced in accordance with the invention, a selection was made, from among the large number of known varnishes, of an alkyd-melamine resin varnish (AM) containing aromatic components and based on a medium-oil alkyd resin and on a butanol-etherified melamine resin, of a polyester varnish (PE) based on cellulose acetobutyrate and on a melamine resin, of a high-solid acrylic resin stoving varnish based on a nonaqueous dispersion (HS), and of a polyurethane-based aqueous varnish (PU).

The color strength and shades were determined in accordance with DIN 55986. The rheology of the millbase after dispersion (millbase rheology) was evaluated visually on the basis of the following five-point scale:

| | |
|---|---|
| 5 | highly fluid |
| 4 | liquid |
| 3 | viscous |
| 2 | slightly set |
| 1 | set |

Following dilution of the millbase to the final pigment concentration, the viscosity was evaluated using the Rossmann viscospatula type 301 from Erichsen. Gloss measurements were carried out on cast films at an angle of 20° in accordance with DIN 67530 (ASTM D 523) using the "multigloss" gloss meter from Byk-Mallinckrodt. The solvent fastness was determined in accordance with DIN 55976. The fastness to overcoating was determined in accordance with DIN 53221.

In the examples below, parts and percentages refer in each case to the weight of the substances so described.

EXAMPLE 1a 900 parts of water are charged to an autoclave, 40.5 parts of perylene-3,4,9,10-tetracarboxylic monoanhydride monomethylimide are introduced and 51.6 parts of N-(2-aminoethyl)piperazine are added. The mixture is then heated to 150° C. under pressure and stirred at 150° C. for 5 hours. After cooling to 25° C., the pigment dispersant is filtered off with suction and washed to neutrality with water. This gives 133.5 parts of 39.4% pure pigment dispersant presscake. A portion is dried at 80° C.

Analysis: calc.: 10.6% N; found: 10.3% N; $^1$H—NMR $(D_2SO_4)$: δ 8.7; 6.6; 6.4; 4.5; 3.8; 3.5; 3.2 ppm.

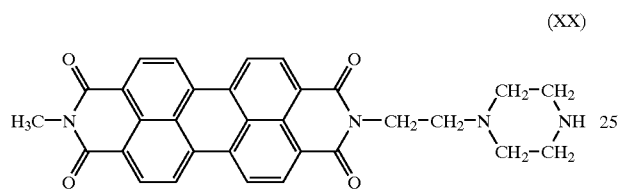

(XX)

EXAMPLE 1b 20 parts of a commercially customary diketopyrrolopyrrole pigment (C.I. Pigment Red 264) are mixed mechanically with 1 part of pigment dispersant of the formula XX prepared in accordance with Example 1a.

A pigment preparation is obtained which gives transparent and strongly colored coatings in the HS varnish. The viscosity is 1.7 s. The gloss measurement gives a value of 70. The metallic coating is strongly colored and bright.

EXAMPLE 2a

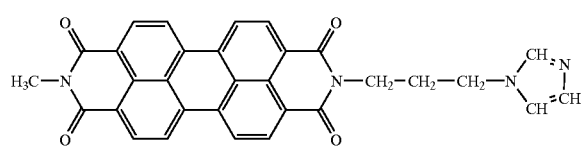

(XXI)

900 parts of water are charged to an autoclave, 40.5 parts of perylene-3,4,9,10-tetracarboxylic monoanhydride monomethylimide are introduced and 50 parts of 1-(3-aminopropyl)imidazole are added. The mixture is then heated to 150° C. under pressure and stirred at 150° C. for 5 hours. After cooling to 25° C., the pigment dispersant is filtered off with suction and washed to neutrality with water. This gives 164 parts of 31.4% pure pigment dispersant presscake. A portion is dried at 80° C.

Analysis: calc.: 10.9% N; found: 10.9% N; $^1$H—NMR $(D_2SO_4)$: δ 8.7; 8.0; 7.0; 4.1; 4.0; 3.5; 2.1 ppm.

EXAMPLE 2b 20 parts of a commercially customary diketopyrrolopyrrole pigment (C.I. Pigment Red 264) are mixed mechanically with 1 part of pigment dispersant of the formula XXI prepared in accordance with Example 2a.

A pigment preparation is obtained which gives transparent and strongly colored coatings in the HS varnish. The viscosity is 4.5 s. The gloss measurement gives a value of 70. The metallic coating is strongly colored and bright. The solvent fastness of the pigment preparation is very good.

EXAMPLE 3a

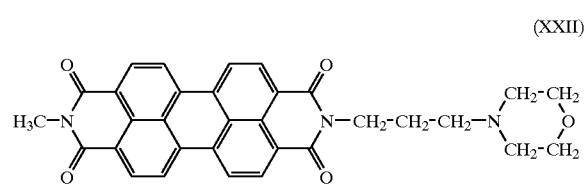

(XXII)

900 parts of water are charged to an autoclave, 40.5 parts of perylene-3,4,9,10-tetracarboxylic monoanhydride monomethylimide are introduced and 57.6 parts of N-(3-aminopropyl)morpholine are added. The mixture is then heated to 150° C. under pressure and stirred at 150° C. for 5 hours. After cooling to 25° C., the pigment dispersant is filtered off with suction and washed to neutrality with water. This gives 330.5 parts of 16.8% pure pigment dispersant presscake. A portion is dried at 80° C.

Analysis: calc.: 7.9% N; found: 7.7% N; $^1$H—NMR $(D_2SO_4)$: δ 8.7; 4.2; 3.9; 3.6; 3.5; 3.2; 3.0; 2.9; 2.0 ppm.

EXAMPLE 3b 20 parts of a commercially customary diketopyrrolopyrrole pigment (C.I. Pigment Red 264) are mixed mechanically with 1 part of pigment dispersant of the formula XXII prepared in accordance with Example 3a.

A pigment preparation is obtained which gives transparent and strongly colored coatings in the HS varnish. The viscosity is 2.3 s. The gloss measurement gives a value of 76. The metallic coating is strongly colored and bright.

EXAMPLE 4a

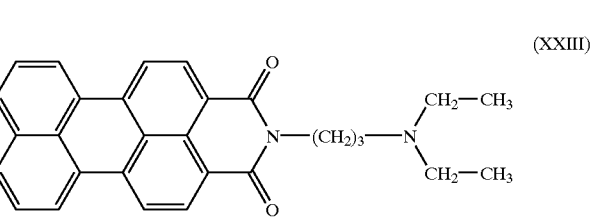

(XXIII)

The pigment dispersant of the formula XXIII is prepared in accordance with U.S. Pat. No. 4,762,569, Example 1.

Analysis: calc.: 9.1% N; found: 8.8% N; $^1$H—NMR $(D_2SO_4)$: δ 8.7; 4.1; 2.9; 2.8; 1.9 and 0.9 ppm.

EXAMPLE 4b 20 parts of a commercially customary diketopyrrolopyrrole pigment (C.I. Pigment Red 264) are mixed mechanically with 1 part of pigment dispersant of the formula XXIII prepared in accordance with Example 4a.

A pigment preparation is obtained which gives transparent and strongly colored coatings in the HS varnish. The viscosity is 1.4 s. The gloss measurement gives a value of 77. The metallic coating is strongly colored and bright.

EXAMPLE 5a

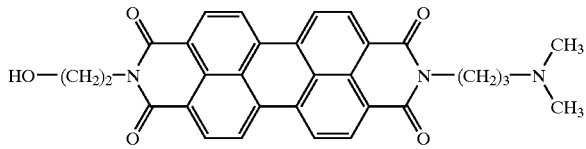

(XXIV)

300 parts of water are charged to an autoclave, 22.7 parts of perylene-3,4,9,10-tetracarboxylic monoanhydride monohydroxyethylimide are introduced and 10.2 parts of dimethylaminopropylamine are added. The mixture is then heated to 150° C. under pressure and stirred at 150° C. for 5 hours. After cooling to 25° C., the pigment dispersant is filtered off with suction and washed to neutrality with water. This gives 81.4 parts of 32.7% pure pigment dispersant presscake. A portion is dried at 80° C.

Analysis: calc.: 8.1% N; found: 7.9% N; $^1$H—NMR (D$_2$SO$_4$): δ 8.7; 5.2; 4.5; 4.4; 4.2; 2.9; 2.5; 2.0 ppm.

EXAMPLE 5b 20 parts of a commercially customary diketopyrrolopyrrole pigment (C.I. Pigment Red 264) are mixed mechanically with 1 part of pigment dispersant of the formula XXIV prepared in accordance with Example 5a.

A pigment preparation is obtained which gives transparent and strongly colored coatings in the HS varnish. Transparent and strongly colored coatings are also obtained in the PU varnish, and the metallic coating is strongly colored as well. The solvent fastness of the pigment preparation is very good.

EXAMPLE 6a

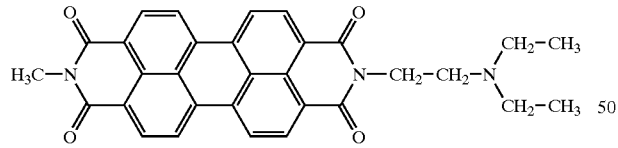

(XXV)

450 parts of water are charged to an autoclave, 37 parts of perylene-3,4,9,10-tetracarboxylic monoanhydride monomethylimide are introduced and 20.9 parts of diethylaminoethylamine are added. The mixture is then heated to 150° C. under pressure and stirred at 150° C. for 5 hours. After cooling to 25° C., the pigment dispersant is filtered off with suction and washed to neutrality with water. This gives 153.6 parts of 29.7% pure pigment dispersant presscake. A portion is dried at 80° C.

Analysis: calc.: 8.3% N; found: 8.7% N; $^1$H—NMR (D$_2$SO$_4$): δ 8.7; 4.4; 3.5; 3.2; 3.0; 1.0 ppm.

EXAMPLE 6b 20 parts of a commercially customary diketopyrrolopyrrole pigment (C.I. Pigment Red 264) are mixed mechanically with 1 part of pigment dispersant of the formula XXV prepared in accordance with Example 6a.

A pigment preparation is obtained which gives transparent and strongly colored coatings in the HS varnish. The viscosity is 1.5 s. The gloss measurement gives a value of 82. The metallic coating is strongly colored and bright. The solvent fastness of the pigment preparation is very good.

EXAMPLE 7a

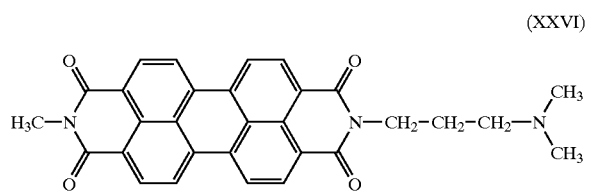

(XXVI)

900 parts of water are charged to an autoclave, 60.8 parts of perylene-3,4,9,10-tetracarboxylic monoanhydride monomethylimide are introduced and 30.6 parts of dimethylaminopropylamine are added. The mixture is then heated to 150° C. under pressure and stirred at 150° C. for 5 hours. After cooling to 25° C., the pigment dispersant is filtered off with suction and washed to neutrality with water. This gives 209.1 parts of 34.0% pure pigment dispersant presscake. A portion is dried at 80° C.

Analysis: calc.: 8.6% N; found: 8.3% N; $^1$H—NMR (D$_2$SO$_4$): δ 8.7; 4.1; 3.5; 2.9; 2.5; 1.9 ppm.

EXAMPLE 7b 20 parts of a commercially customary diketopyrrolopyrrole pigment (C.I. Pigment Red 264) are mixed mechanically with 1 part of pigment dispersant of the formula XXVI prepared in accordance with Example 7a.

A pigment preparation is obtained which gives transparent and strongly colored coatings in the HS varnish. The viscosity is 1.0 s. The gloss measurement gives a value of 82. The metallic coating is strongly colored and bright. The solvent fastness of the pigment preparation is very good.

EXAMPLE 8a

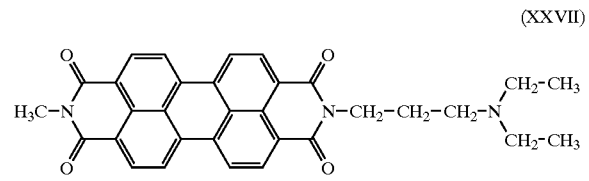

(XXVII)

900 parts of water are charged to an autoclave, 60.8 parts of perylene-3,4,9,10-tetracarboxylic monoanhydride monomethylimide are introduced and 39 parts of diethylaminopropylamine are added. The mixture is then heated to 150° C. under pressure and stirred at 150° C. for 5 hours. After cooling to 25° C., the pigment dispersant is filtered off with suction and washed to neutrality with water. This gives 274.9 parts of 25.8% pure pigment dispersant presscake. A portion is dried at 80° C.

Analysis: calc.: 8.1% N; found: 8.0% N; $^1$H—NMR (D$_2$SO$_4$): δ 8.7; 4.1; 3.5; 2.8; 1.9; 0.9 ppm.

EXAMPLE 8b

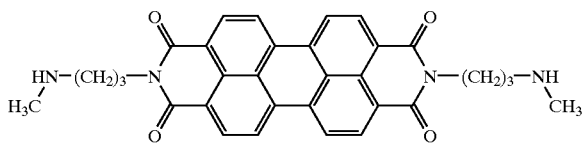
(XXVIII)

500 parts of water are charged to an autoclave, 189.7 parts of 20.7% pure perylene-3,4,9,10-tetracarboxylic dianhydride presscake are introduced and 26.4 parts of methylaminopropylamine are added. The mixture is then heated to 150° C. under pressure and stirred at 150° C. for 5 hours. After cooling to 25° C., the pigment dispersant is filtered off with suction and washed to neutrality with water. This gives 145.8 parts of 38.8% pure pigment dispersant presscake. A portion is dried at 80° C.

Analysis: calc.: 10.5% N; found: 10.4% N; $^1$H—NMR ($D_2SO_4$): δ 8.5; 5.6; 4.0; 2.7; 2.3; 1.8 ppm.

EXAMPLE 8c 20 parts of a commercially customary diketopyrrolopyrrole pigment (C.I. Pigment Red 264) are mixed mechanically with 1 part of pigment dispersant of the formula XXVII prepared in accordance with Example 8a and with 1 part of pigment dispersant of the formula XXVIII prepared in accordance with Example 8b. A pigment preparation is obtained which gives transparent and strongly colored coatings in the HS varnish. The rheology is evaluated as being 4 and the viscosity is 1.9 s. The gloss measurement gives a value of 82. The metallic coating is strongly colored and bright.

A coating was likewise prepared in the HS varnish using the commercially customary diketopyrrolopyrrole pigment used for the pigment preparation (C.I. Pigment Red 264). A comparison of the coatings reveals that without the use of a pigment dispersant the coating is more hiding, the rheology is evaluated as being only 3, the viscosity is so high that it cannot be measured using the viscospatula, the gloss measurement gives a value of only 23, and the metallic coating is weaker in color and pale.

EXAMPLE 9a 500 parts of water are charged to an autoclave, 189.7 parts of 20.7% pure perylene-3,4,9,10-tetracarboxylic dianhydride presscake are introduced and 34.8 parts of diethylaminoethylamine are added. The mixture is then heated to 150° C. under pressure and stirred at 150° C. for 5 hours. After cooling to 25° C., the pigment dispersant is filtered off with suction and washed to neutrality with water.

This gives 130 parts of 43.2% pure pigment dispersant presscake. A portion is dried at 80° C.

Analysis: calc.: 9.5% N; found: 9.5% N; $^1$H—NMR ($D_2SO_4$): δ 8.5; 4.2; 3.0; 2.8; 0.8 ppm.

EXAMPLE 9b

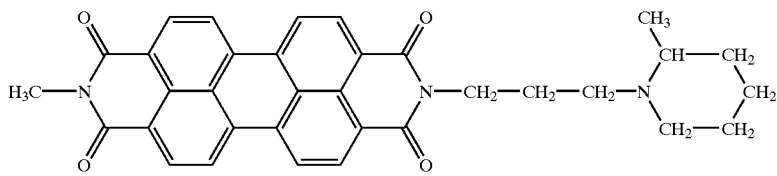
(XXX)

900 parts of water are charged to an autoclave, 40.5 parts of perylene-3,4,9,10-tetracarboxylic monoanhydride monomethylimide are introduced and 62.4 parts of 1-(3-aminopropyl)-2-pipecoline are added. The mixture is then heated to 150° C. under pressure and stirred at 150° C. for 5 hours. After cooling to 25° C., the pigment dispersant is filtered off with suction and washed to neutrality with water. This gives 189.8 parts of 31.1% pure pigment dispersant presscake. A portion is dried at 80° C.

Analysis: calc.: 7.7% N; found: 7.7% N; $^1$H—NMR ($D_2SO_4$): δ 8.7; 4.1; 3.5; 3.1; 2.8; 2.5; 1.9; 1.3 ppm.

EXAMPLE 9c 20 parts of a commercially customary diketopyrrolopyrrole pigment (C.I. Pigment Red 264) are mixed mechanically with 1 part of pigment dispersant of the formula XXIX prepared in accordance with Example 9a and with 1 part of pigment dispersant of the formula XXX prepared in accordance with Example 9b.

A pigment preparation is obtained which gives transparent and strongly colored coatings in the HS varnish. The viscosity is 1.3 s. The gloss measurement gives a value of 80. The metallic coating is strongly colored and bright.

In the PE varnish, the pigment preparation likewise gives transparent and strongly colored coatings, and the metallic coating as well is strongly colored and bright. A coating was likewise prepared in the PE varnish using the commercially customary diketopyrrolopyrrole pigment used for the pigment preparation (C.I. Pigment Red 264). A comparison of the coatings in the PE varnish reveals that without the use of a pigment dispersant the coating is significantly more hiding and weaker in color, and the metallic coating is weaker in color and pale.

Example 10a 500 parts of water are charged to an autoclave, 189.7 parts of 20.7% pure perylene-3,4,9,10-tetracarboxylic dianhydride

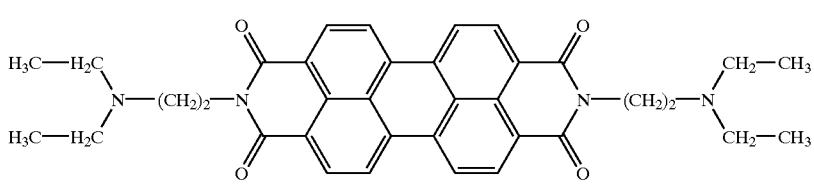
(XXIX)

dride presscake are introduced and 52 parts of diethylaminopropylamine are added. The mixture is then heated to 150° C. under pressure and stirred at 150° C. for 5 hours. After cooling to 25° C., the pigment dispersant is filtered off with suction and washed to neutrality with water. This gives 138.2 parts of 45.2% pure pigment dispersant presscake of the formula XXIII depicted in Example 4a. A portion is dried at 80° C.

Analysis: calc.: 9.1% N; found: 9.1% N; $^1$H—NMR ($D_2SO_4$): δ 8.7; 4.1; 2.8; 1.9 and 0.9 ppm.

EXAMPLE 10b 10 parts of a commercially customary diketopyrrolopyrrole pigment (C.I. Pigment Red 264) are mixed mechanically with 1 part of pigment dispersant of the formula XXIII prepared in accordance with Example 10a.

A pigment preparation is obtained which gives transparent and strongly colored coatings in the HS varnish. The viscosity is 1.5 s. The metallic coating is strongly colored and bright.

EXAMPLE 11a

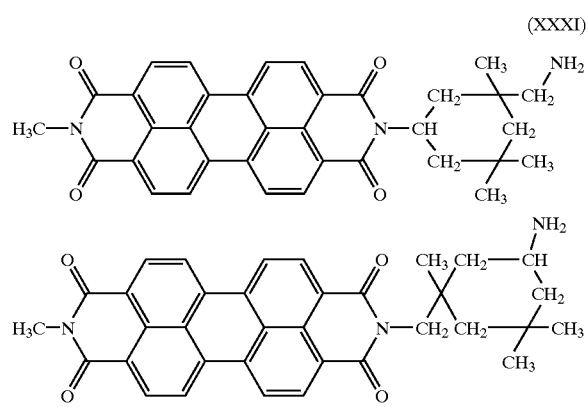

(XXXI)

900 parts of water are charged to an autoclave, 40.5 parts of perylene-3,4,9,10-tetracarboxylic monoanhydride monomethylimide are introduced and 68 parts of isophoronediamine are added. The mixture is then heated to 150° C. under pressure and stirred at 150° C. for 5 hours. After cooling to 25° C., the pigment dispersant is filtered off with suction and washed to neutrality with water. This gives 215.9 parts of 24.9% pure pigment dispersant presscake consisting of a mixture in accordance with formula XXXI. A portion is dried at 80° C.

Analysis: calc.: 7.5% N; found: 7.3% N; $^1$H—NMR ($D_2SO_4$): δ 8.7; 4.0; 3.5; 3.2; 2.6; 2.0; 1.6; 1.4; 1.2; 1.0; 0.8; 0.7 ppm.

EXAMPLE 11b 30 parts of a commercially customary diketopyrrolopyrrole pigment (C.I. Pigment Red 264) are mixed mechanically with 1.5 parts of pigment dispersant of the formula XXXI prepared in accordance with Example 11a. A pigment preparation is obtained which gives transparent and strongly colored coatings in the AM varnish. The viscosity is 6.5 s. The gloss measurement gives a value of 70. The fastness to overcoating is very good.

A coating was likewise prepared in the AM lacquer using the commercially customary diketopyrrolopyrrole pigment used for the pigment preparation (C.I. Pigment Red 264). A comparison of the coatings in the AM varnish reveals that without the use of a pigment dispersant the coating is substantially more hiding, the viscosity is so high that it cannot be measured with the viscospatula, and the gloss is likewise unmeasurable owing to the severe flocculation.

In the PE varnish, the pigment preparation gives transparent coatings, the rheology is evaluated as being 4, the viscosity is 2.3 s and the metallic coating is strongly colored and bright.

A coating was likewise prepared in the PE varnish using the commercially customary diketopyrrolopyrrole pigment (C.I. Pigment Red 264) used for the pigment preparation. A comparison of the coatings in the PE varnish shows that without the use of a pigment dispersant the coating is substantially more hiding, the rheology is evaluated as being only 3, the viscosity is 4.5 s and the metallic coating is weaker in color and pale.

EXAMPLE 12

272.9 parts of tert-amyl alcohol are introduced initially and 80 parts are removed by distillation. Then 13.8 parts of sodium are introduced. Stirring is continued at the boiling temperature until the sodium has fully reacted. At 95° C., 41.7 parts of p-chlorobenzonitrile are introduced, after which 45.5 parts of diisopropyl succinate are added dropwise over the course of 2 h. The mixture is then heated to boiling and stirred at the boiling temperature for 4 h, and the resulting reaction mixture is cooled to 60° C. In a second stirred vessel, 100 parts of water and 210 parts of ice are introduced initially and the reaction mixture is tipped onto this ice-water charge. The resulting suspension is heated to 110° C. in a pressure vessel and stirred at 110° C. for 5 h. After the suspension has been cooled to room temperature, 6.3 parts of 39.4% pure pigment dispersant presscake of the formula (XX), prepared in accordance with Example 1a, are added. After heating to boiling temperature, the mixture is stirred at the boiling temperature for 2 h. Then the tert-amyl alcohol is removed by steam distillation, the aqueous suspension is filtered, and the presscake is washed with water and dried at 80° C. in a circulating-air oven. This gives 46.3 g of granules of a pigment preparation based on Pigment Red 254. The granules are pulverized on a laboratory mill.

The pigment preparation gives strongly colored coatings in the AM varnish. The rheology is evaluated as being 4, and the viscosity is 5.1 s. The gloss measurement gives a value of 71.

What is claimed is:
1. A pigment preparation comprising
   a) from 40 to 99% by weight of at least one diketopyrrolopyrrole pigment or a mixed crystal containing a diketopyrrolopyrrole pigment, and
   b) from 1 to 40% by weight of at least one pigment dispersant of formula (I);

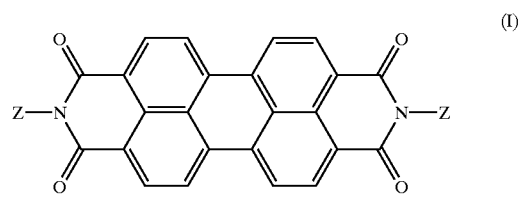

(I)

in which the two radicals Z are identical or different and have the definition $Z^3$ or $Z^4$ with the proviso that both radicals Z are not simultaneously $Z^4$, and in which $Z^3$ is a radical of the formula (Ic),

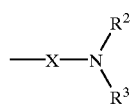

(Ic)

in which

R² and R³ are identical or different and are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, possible substituents being hydroxyl, phenyl, cyano, chloro, bromo, $C_2$–$C_4$-acyl and $C_1$–$C_4$-alkoxy, or R² and R³ together with the nitrogen atom form a saturated, unsaturated or aromatic heterocyclic ring with or without a further nitrogen, oxygen or sulfur atom in the ring; and X is a branched or unbranched $C_2$–$C_6$-alkylene radical or a $C_5$–$C_7$-cycloalkylene radical which can be substituted by from 1 to 4 substituents selected from the group consisting of $C_1$–$C_6$-alkyl radicals, hydroxyl radicals, hydroxyalkyl radicals having 1 to 4 carbon atoms and by 1 or 2 $C_5$–$C_7$-cycloalkyl radicals; $Z^4$ is hydrogen, hydroxyl, amino, phenyl, ($C_1$–$C_4$alkyl)phenyl or $C_1$–$C_{20}$-alkyl, it being possible for the phenyl ring and the alkyl group to be substituted by one or more substituents selected from the group consisting of Cl, Br, CN, OH, $C_6H_5$, carbamoyl, $C_2$–$C_4$-acyl and $C_1$–$C_4$-alkoxy and for the phenyl ring to be substituted by $NR^2R^3$ or for the alkyl group to be perfluorinated or partly fluorinated;

the fractions of the respective components based on the overall weight of the preparation (100% by weight).

2. The pigment preparation as claimed in claim 1, wherein X is $C_2$–$C_4$-alkylene or cyclohexylene.

3. The pigment preparation as claimed in claim 1, wherein R² and R³ are identical or different and are a hydrogen atom, a $C_1$–$C_6$-alkyl group, or a $C_1$–$C_6$-alkyl group substituted by 1 or 2 substituents selected from the group consisting of hydroxyl, acetyl, methoxy, ethoxy, chloro and bromo, or R² and R³ together with the adjacent nitrogen atom form an imidazolyl, piperidyl, morpholinyl, pipecolinyl, pyrrolyl, pyrrolidinyl, pyrazolyl or piperazinyl ring.

4. The pigment preparation as claimed in claim 1, wherein $Z^3$ has one of the definitions —(CH₂)₂—NH₂,

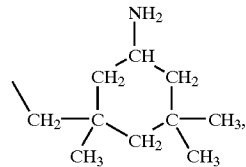

—(CH₂)₃—NH₂, —CH₂—CH(CH₃)—NH₂, —CH₂—C(CH₃)₂—CH₂—NH₂,

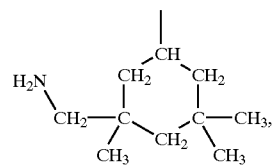

—(CH₂)₂—NH—CH₃, —(CH₂)₂—N(CH₃)₂, —(CH₂)₂—NH—CH₂—CH₃, —(CH₂)₂—N(CH₂—CH₃)₂, —(CH₂)₃—NH—CH₃, —(CH₂)₃—N(CH₃)₂, —(CH₂)₃—NH—CH₂—CH₃ and —(CH₂)₃—N(CH₂—CH₃)₂.

5. The pigment preparation as claimed in claim 1, wherein $Z^4$ is hydrogen, amino, phenyl, benzyl, $NR^2R^3$-substituted phenyl or benzyl, $C_1$–$C_6$-alkyl or a $C_2$–$C_6$-alkyl substituted by 1 or 2 substituents selected from the group consisting of hydroxyl, acetyl, methoxy and ethoxy.

6. The pigment preparation as claimed in claim 1, wherein the diketopyrrolopyrrole pigment is C.I. Pigment Red 254, C.I. Pigment Red 255, C.I. Pigment Red 264, C.I. Pigment Red 270, C.I. Pigment Red 272, C.I. Pigment Orange 71 or C.I. Pigment Orange 73.

7. The pigment preparation as claimed in claim 1, comprising i) from 40 to 99% by weight of component a);

ii) from 1 to 40% by weight of component b);

iii) from 0 to 20% by weight of surface-active agents; and iv) from 0 to 20% by weight of conventional additives, the fractions of the respective components being based on the overall weight of the preparation (100% by weight).

8. The pigment preparation as claimed in claim 1, comprising i) from 70 to 98% by weight of component a);

ii) from 2 to 30% by weight of component b);

iii) from 0.1 to 15% by weight of surface-active agents; and iv) from 0.1 to 10% by weight of conventional additives, the fractions of the respective components being based on the overall weight of the preparation (100% by weight).

9. A process for producing a pigment preparation as claimed in claim 1, which comprises mixing the pigment dispersant b) and the pigment a) with one another.

10. The process as claimed in claim 9, wherein the pigment dispersant b) is added prior to or following the synthesis of the pigment a); following fine division of the pigment a); or following a finish operation on the pigment a).

11. The process as claimed in claim 9, wherein the pigment dispersant(s) of b), the pigment of component a), or both, are combined in the form of a water-moist presscake or are mixed with one another in the form of dry granules or powders.

12. A method of pigmenting high molecular mass organic materials, writing, drawing and printing inks comprising the step of adding a pigment preparation as claimed in claim 1 into said high molecular mass organic material or ink base to be pigmented.

13. The method as claimed in claim 12, wherein the high molecular mass organic material is a plastic, resin, varnish, paint, electrophotographic toner or developer or a powder coating material.

14. The method as claimed in claim 12, wherein the printing ink is an inkjet ink.

15. A prepared pigment formulation consisting essentially of a pigment preparation as claimed in claim 1, a high molecular mass organic material, and, optionally surface-active agents.

16. The prepared pigment formulation as claimed in claim 15, wherein the high molecular mass organic material is a varnish.

* * * * *